May 24, 1955   H. LEVENSTEIN ET AL   2,709,234
ELECTRIC MOTOR SPEED CONTROL SYSTEM
Filed Nov. 21, 1951   6 Sheets-Sheet 1

INVENTORS
HAROLD LEVENSTEIN
AND MICHAEL BRACUTT
BY
*Moran, Nolte, Cairo & Berry*
ATTORNEYS

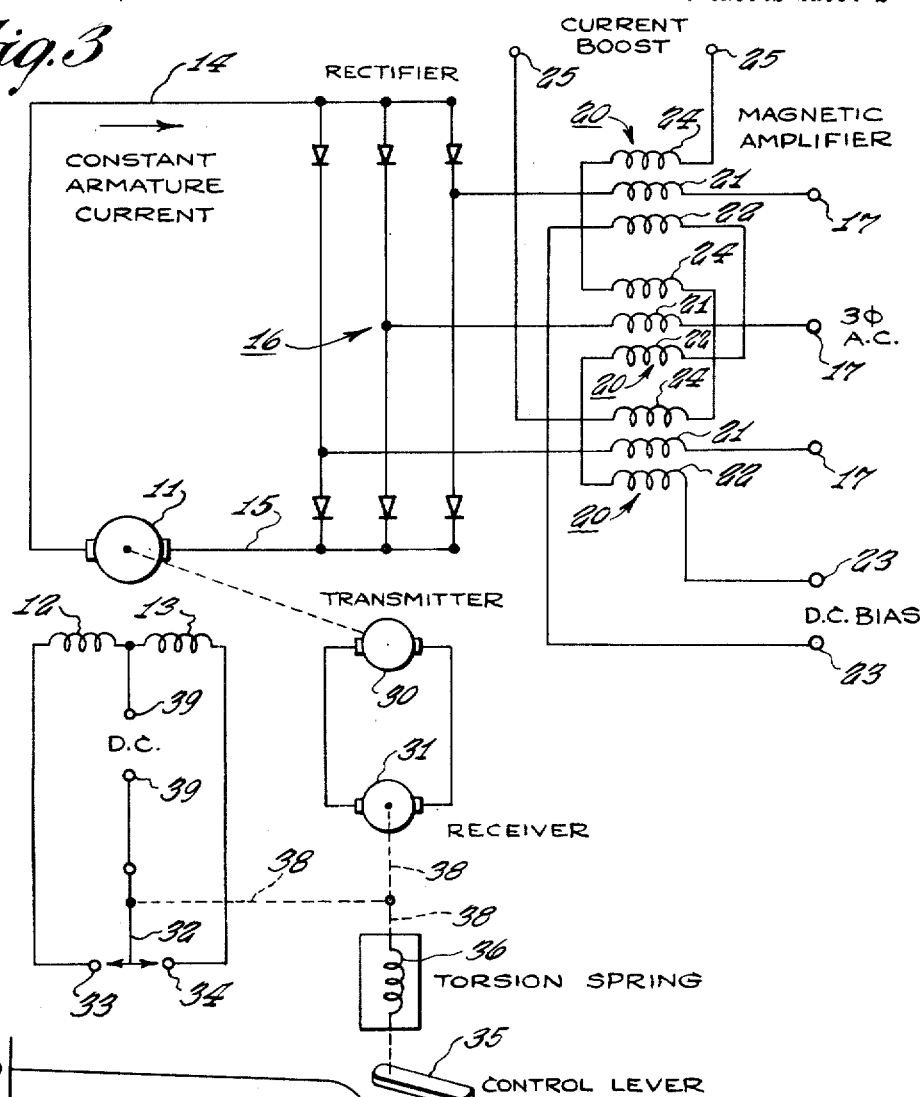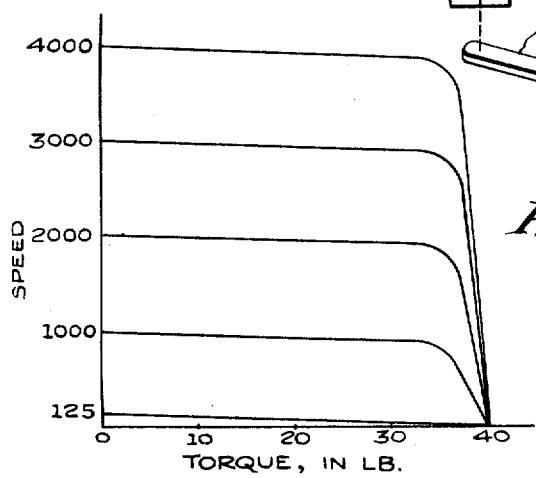

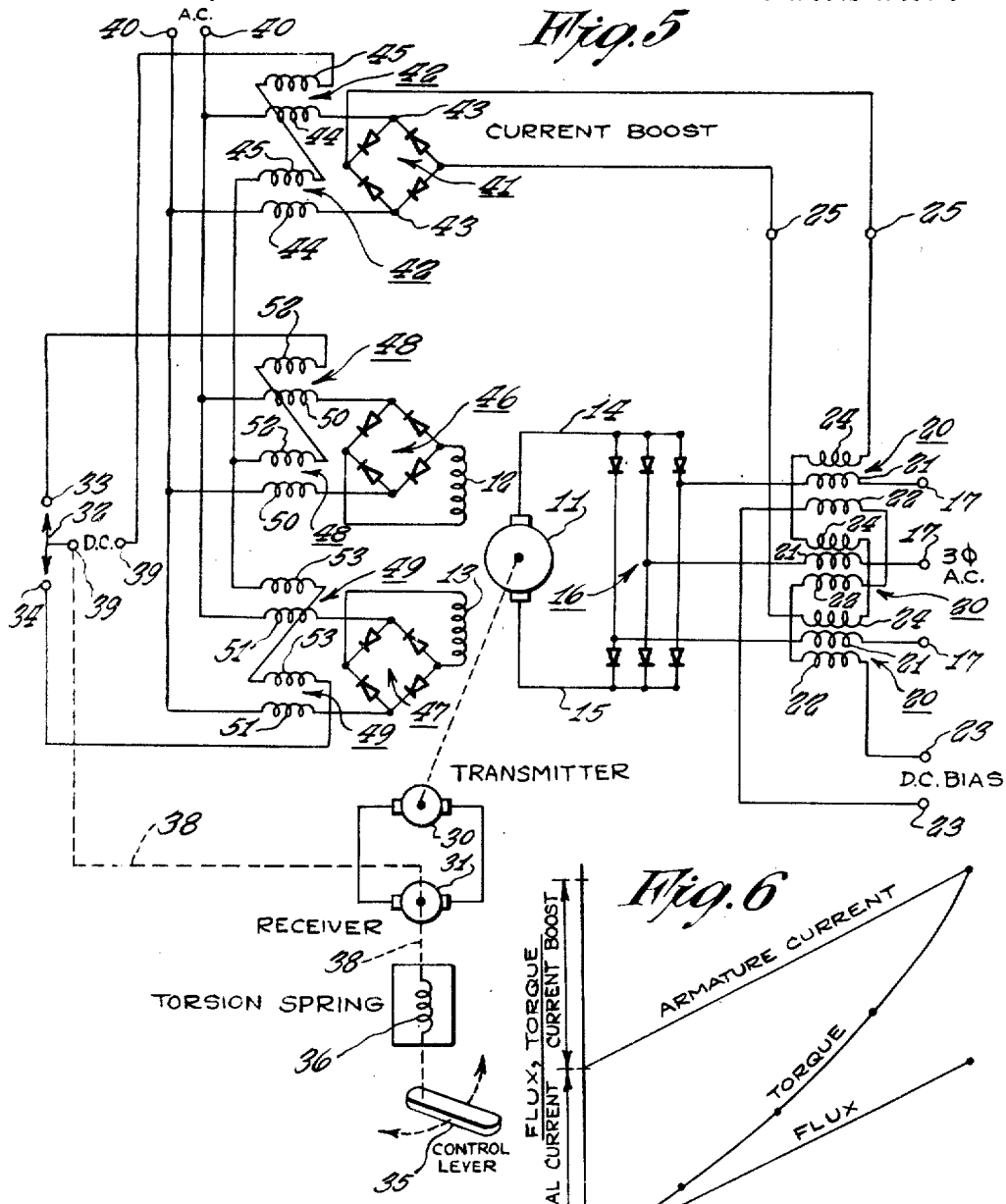

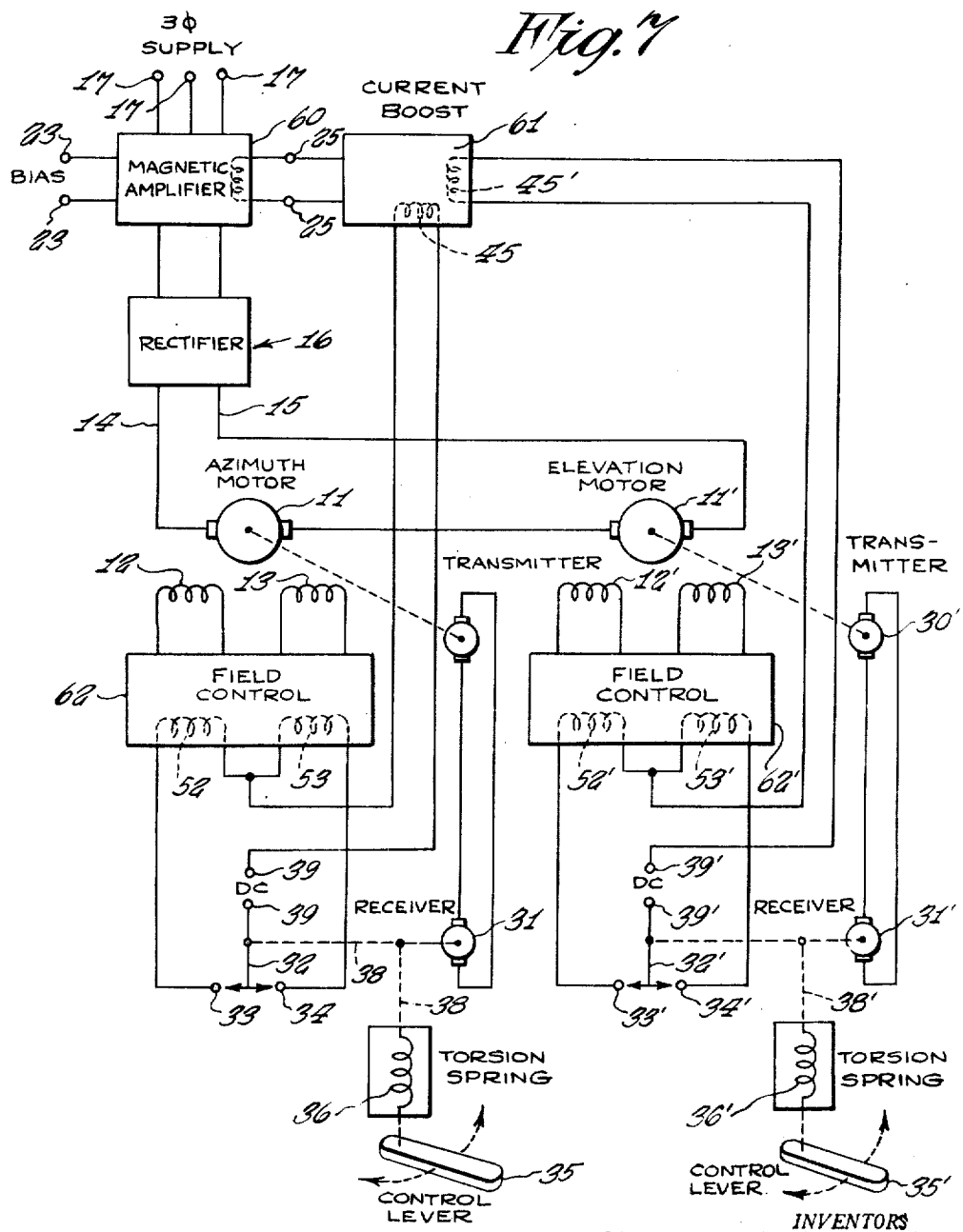

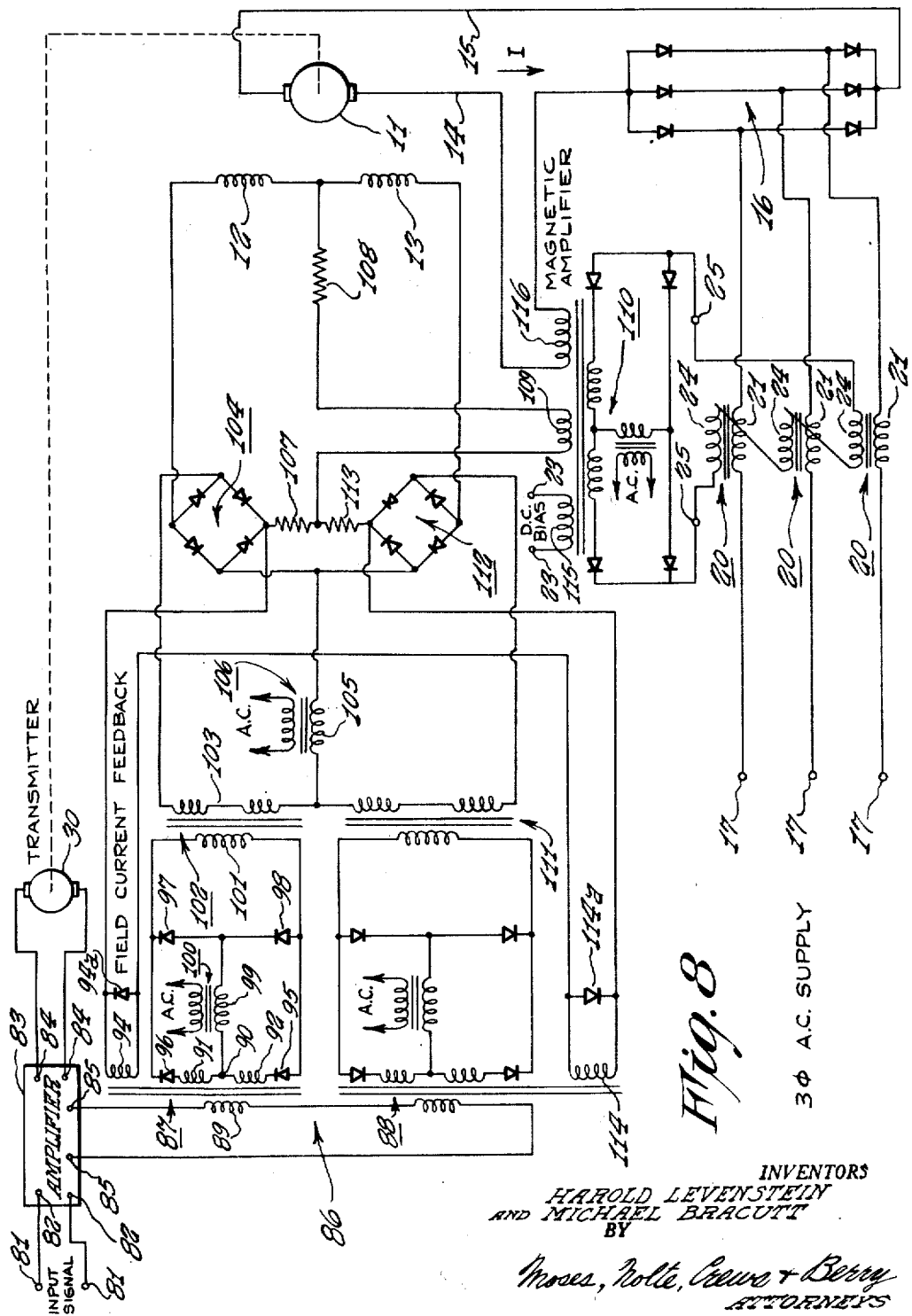

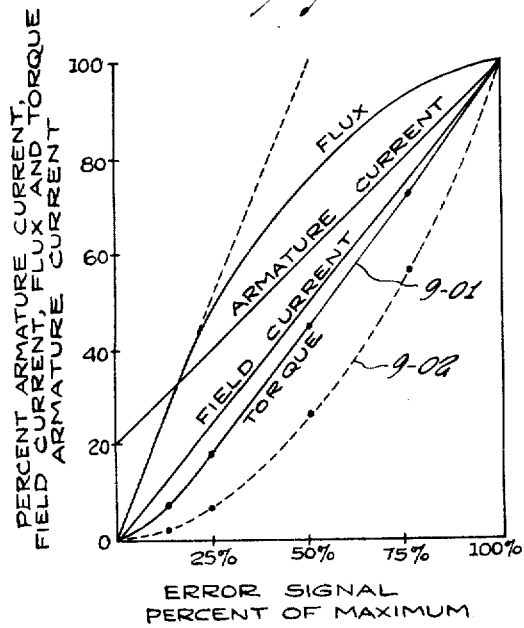
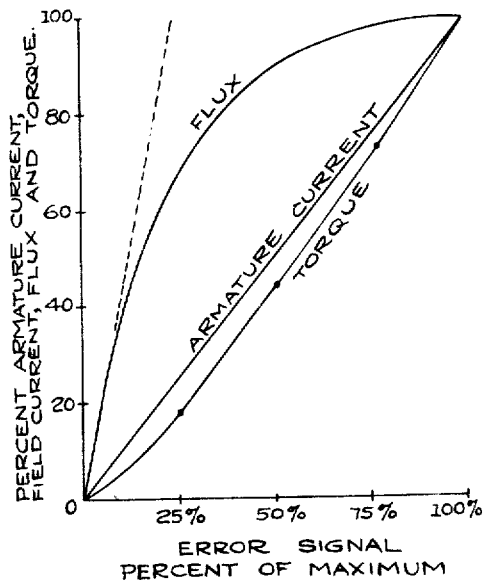
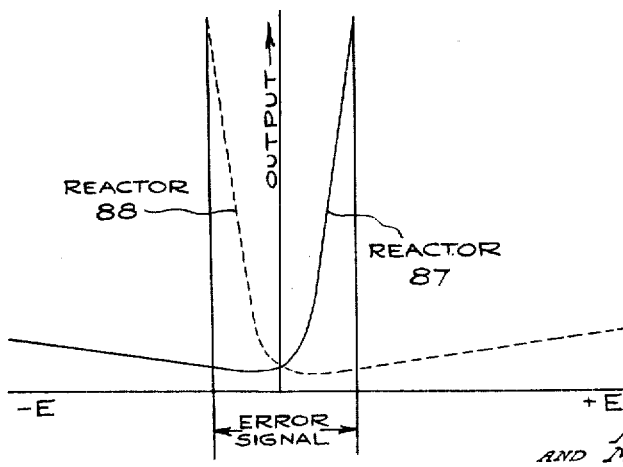

United States Patent Office 2,709,234
Patented May 24, 1955

2,709,234

ELECTRIC MOTOR SPEED CONTROL SYSTEM

Harold Levenstein, Oceanside, N. Y., and Michael Bracutt, East Orange, N. J., assignors to The W. L. Maxson Corporation, New York, N. Y., a corporation of New York Application November 21, 1951, Serial No. 257,484

23 Claims. (Cl. 318—67)

The present invention relates to motor control systems, and more particularly to systems of this character in which a small or relatively weak input signal is utilized to control the mechanical displacement of a comparatively heavy load which is driven by a direct current motor.

Systems of this character are well known in which a separate motor-generator set is provided for energizing the armature of the drive motor, the drive motor field being maintained at substantially constant excitation. The input signal is applied to the generator field, and this will determine both the polarity and magnitude of the armature excitation of the drive motor, and hence both its direction and speed of rotation.

Systems of this type which utilize a separate motor-generator set have certain inherent disadvantages which are not found in the system of the present invention. One of these disadvantages is a time lag which is caused by a drop in the speed of the motor being controlled whenever the armature current is increased to obtain increased torque. The constant armature current feature of the present invention minimizes the time lag of the system with a resulting decrease in any tendency to hunt and a corresponding increase in the speed of response of the motor to the control signal.

A further advantage of the present invention resides in the elimination of the separate motor generator for armature excitation. This is particularly desirable in airborne installations where the resulting reduction in weight is of major importance.

The novel control system of the present invention provides substantially constant direct current armature excitation, the constant current being supplied to the armature from a bridge type rectifier. The rectifier is supplied with alternating current from a constant potential source through a saturable reactor whose inherent constant current characteristics produce the desired constancy of the armature current, throughout a wide range of operating conditions.

Control of the speed and direction of motor rotation is obtained by control of the motor field excitation.

The invention also includes means for temporarily increasing the armature current during periods of acceleration, and is adaptable for use in the simultaneous operation of two motors, as in directing a gun by motor operated control of its azimuth and elevation.

The invention also contemplates the inclusion of certain feed-back paths within the control system. Where separate field windings are used for each direction of motor rotation, one of the feed-back paths minimizes the undesirable transient effects caused by electromagnetic coupling between the two field windings. Another feed-back path improves motor performance and reduces losses during rapid deceleration.

Another feature of the invention resides in the inherent dynamic braking action of the bridge type rectifier which supplies the armature current, particularly when the control signal calls for a rapid reversal of the direction of armature rotation.

Other features and advantages of the invention will become apparent upon reading the following specification together with the accompanying drawing forming a part thereof.

Referring to the drawing:

Figure 3 is a schematic circuit diagram of another embodiment of the invention, in which the armature current is increased to provide increased torque;

Figure 4 is a graphical representation showing the speed-torque characteristics of a motor controlled by an embodiment of the invention;

Figure 5 is a schematic diagram of an embodiment of the invention in which the armature current is increased to provide increased torque and acceleration, in accordance with the amount of field excitation.

Figure 6 is a graphical representation showing the relationships between the input signal, the armature current, the motor flux and the resulting torque throughout the full range of motor speeds.

Figure 7 is a schematic circuit diagram of an embodiment of the invention in which two motors are separately controlled;

Figure 8 is a schematic circuit drawing of an embodiment of the invention including feed-back paths.

Figures 9 and 10 are graphs illustrating motor torque curves together with other motor characteristics; and Figure 11 is a graph illustrating the response characteristics of a self-excited magnetic amplifier.

Figure 1:
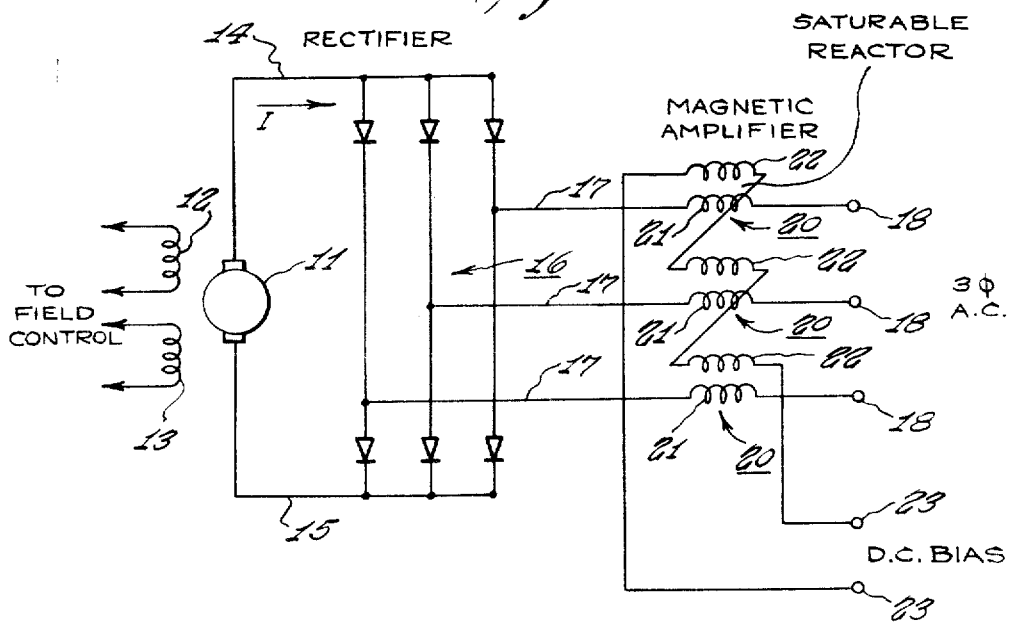
Figure 1 is a schematic circuit diagram of an embodiment of the invention.

Referring to Figure 1, a direct-current motor comprising an armature designated 11 is shown provided with separate field windings 12 and 13, one of these windings being excited for operation of the motor in one direction of rotation and the other winding being used for the opposite direction. Although separate field windings are shown, by obvious changes in the control arrangements, a single field winding may be used.

Armature 11 is connected by conductors 14 and 15 to a conventional three-phase rectifier designated generally as 16. Three supply leads 17 are adapted for energization from a suitable source of three-phase alternating current, terminals 18 being provided for this purpose. Serially included in each of the supply leads 17 is an individual saturable reactor 20.

Each of the saturable reactors 20 is shown provided with an alternating current load winding 21 whose reactance may be varied by changing the current flow in a direct current control winding 22. The magnitude of the reactance of the alternating current load windings 21 will control the amount of current flow in rectifier 16. The three control windings 22 are shown connected in series and to terminals 23 to which a suitable direct current bias may be applied.

Figure 2:
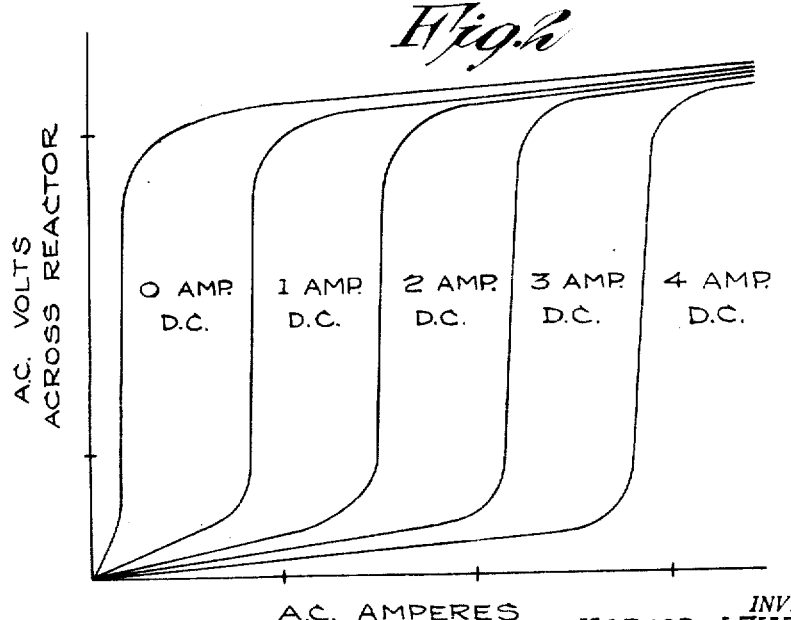
Figure 2 is a graphical representation of the constant current characteristics of the saturable reactors used in the control system of the invention.

Figure 2 shows the operating characteristics of the saturable reactors 20. Such reactors are well known, and the range through which the desired constancy of current will be maintained is a matter of design for the particular reactor being used. The alternating current which flows through each reactor remains substantially constant within a narrow range of variation over a comparatively wide range of variation of alternating current potential drop across the load windings of the reactors. This maintains substantially constant current in the rectifier 16 and in the motor armature 11. The value of the constant current may be adjusted by changing the direct-current excitation of the control windings 22. The family of curves in Figure 2 shows that the degree of constancy of alternating current flow is substantially the same over a comparatively wide range of direct current control bias. Once this bias has been adjusted to the desired value, it will ordinarily remain undisturbed during the continued operation of the control system.

In Figure 3, a speed control system is shown by way of illustration which includes the arrangement shown in Figure 1 together with additional control apparatus. The three saturable reactors 20 are shown provided with additional direct-current control windings 24 which are serially connected to terminals 25 for energization when it is desired to provide a temporary increase in the otherwise constant armature current. The arrangements for energizing this armature current boosting circuit are described below.

A transmitter or tachometer generator 30 which determines the magnitude of a unidirectional current in accordance with armature speed is driven by armature 11, and may be a very small direct current generator having a permanently magnetized field. Transmitter 30 develops a unidirectional control voltage whose magnitude and polarity are determined by the speed and direction of rotation, respectively, of armature 11. Any other type of control device which will change the magnitude and polarity of an electrical current in accordance with armature speed may also be used.

This unidirectional voltage is applied directly to a receiver 31 which may be a small direct current motor having a permanently magnetized field, or it may have a structure similar to that of a conventional polarized relay. Receiver 31 is mechanically connected to cause displacement of a movable contact member 32. When receiver 31 is energized by transmitter 30 with unidirectional current of one polarity, it causes movable contact member 32 to engage a stationary contact 33, and when energized with current of the opposite polarity, receiver 31 causes engagement between movable contact member 32 and another stationary contact 34. Contacts 33 and 34 are included in the energizing circuits for the two field windings 12 and 13, respectively.

A manually operable control lever 35 is mechanically connected to receiver 31 through an intermediate resilient member shown by way of illustration as a torsion spring 36. The mechanical connection between receiver 31, movable contact member 32 and torsion spring 36 is represented diagrammatically by a dotted line 38.

In its normal position, control lever 35 produces no stress in torsion spring 36, and movable contact member 32 is disengaged from both stationary contacts 33 and 34. This maintains an open circuit condition in both field windings 12 and 13. Terminals 39 are supplied with direct current of appropriate characteristics for the energization of either field winding 12 or 13.

Upon displacement of control lever 35 from its normal position, torsion spring 36 is stressed. This urges movable contact member 32 into yielding engagement with either stationary contact 33 or stationary contact 34, depending upon the direction in which lever 35 was displaced from its normal position.

Assume, for example, that lever 35 was displaced to cause engagement between movable contact member 32 and stationary contact 33. An energizing circuit is then established through these two closed contacts 32—33 from field circuit power supply terminals 39 to field winding 12. Since armature 11 is continuously supplied with a substantially constant direct current by rectifier 16 and saturable reactors 20, energization of field winding 12 will immediately cause rotation of armature 11. This rotation drives transmitter 30, which thereupon generates a unidirectional voltage whose magnitude and direction are determined by the speed and direction of rotation of armature 11. This unidirectional voltage acts upon receiver 31 to produce a torque whose direction is such as to tend to cause separation between movable contact member 32 and stationary contact 33. When the desired speed is attained, as determined by the amount of displacement of control lever 35, contacts 32—33 separate, deenergizing field 12, which results in deceleration of armature 11. This deceleration is accomplished by a reduction in the torque of receiver 31 and thereupon, contacts 32—33 reengage, again energizing field 12. This results in a vibratory or intermittent energization of field 12 which produces a substantially constant average speed of rotation of armature 11. This action is similar to that of the conventional voltage regulator which utilizes vibratory contacts for energization of the field of the generator which it controls. It will also be noted that this arrangement provides constancy of the selected speed, notwithstanding variations in the mechanical load driven by armature 11.

The arrangement described above provides speed control for the motor in accordance with the mechanical displacement of a control lever. The invention may also be applied to speed control utilizing an electrical input signal instead of the mechanical control lever 35, such a signal being converted to a mechanical torque applied to torsion spring 36 by any suitable electromechanical means.

The specific embodiment of the invention shown in Figure 3 illustrates the application of the invention to a speed control system, since the receiver 31 is influenced by a voltage generated by transmitter 30, which voltage is determined by the speed of armature 11. If the voltage applied to receiver 31 were to be determined by the position of the mechanical load driven by armature 11 instead of by its speed, then the control system will be position-responsive instead of speed-responsive. Position-responsive devices for varying the direction and magnitude of a control current include such well known arrangements as a potentiometer mechanically connected to the driven load, from which a potential is taken whose magnitude or polarity or both will be determined by the actual position of the load. This last potential is ordinarily compared by any desired means with another potential whose characteristics are determined by the desired position of the load. When the actual load position coincides with its desired position, the result of the comparison will be substantially zero. The magnitude and direction of the result of the comparison will usually correspond to the magnitude and direction of the deviation of the actual load position from its desired position, and is commonly referred to as an "error signal."

Since it is apparent, as in the example illustrated in Figure 3, that an actual mechanical condition of the load may be converted into an electrical indication, and that the desired load condition, as determined by the angular position of control lever 35, may be converted into an electrical effect, it will be understood that the invention is applicable to any type of control system wherein the desired condition of a motor driven mechanical load, and also the corresponding actual load condition may be converted either into electrical potentials which may be compared, or into mechanical or other effects which may be compared, the result of the comparison, hereinafter referred to as the error signal, being a unidirectional electrical current or potential, or its mechanical equivalent, whose magnitude and direction is determined by the amount of deviation of the actual load condition from its desired condition.

In the case of Figure 3, the error signal is the net mechanical torque applied to movable contact member 32, which by engagement with either of the two stationary contacts 33 or 34, converts this error signal into an electrical effect.

Figure 4 illustrates test results which show clearly the degree of constancy of speed under varying load conditions which may be achieved by means of the control system of the present invention. The different curves represent performance for different speed settings of control lever 35.

Figure 5 shows an arrangement in which the armature current is boosted from its normal constant value to a higher value in order to obtain temporarily increased torque for rapid acceleration to the desired speed. The circuit arrangement of Figure 5 is similar to that shown in Figure 3, with additional saturable reactors and rectifiers for increasing the armature current and controlling the current supplied to the motor field windings.

In the arrangement of Figure 5, a pair of terminals 40 is provided for energization from a suitable source of single phase alternating current, terminals 17 being energized by a source of three phase alternating current, as described above. This three phase current, through the action of rectifier 16 and saturable reactors 20, provides the constant direct current which normally flows through armature 11. Direct current for the armature current adjusting bias is supplied from terminals 23 through the serially connected bias control windings 22 of saturable reactors 20. Each of the saturable reactors 20 is provided with an additional control winding 24 for temporarily boosting the armature current from its normal constant value. Unidirectional boosting current is supplied to the three control windings 24, which are serially connected to terminals 25, from a bridge type rectifier 41 which is supplied with alternating current from terminals 40, a pair of saturable reactors 42 being serially included in the connections to the alternating current terminals 43 of rectifier 41. The alternating current load windings 44 of saturable reactors 42 are normally of high impedance, so that very little current will be delivered to terminals 43 and 25, thus normally providing a negligible effect upon the armature circuit saturable reactors 20 by reason of any residual current flowing in their armature current boosting control windings 24.

Upon the flow of unidirectional biasing current through biasing windings 45 of saturable reactors 42, the total impedance of their alternating current load windings 44 will be reduced to an extent dependent upon the amount of such current flow in the control windings 45. This decrease in impedance of load windings 44 will in turn cause an increase in the output of rectifier 41, and this increased output will correspondingly increase the current flow through the armature current boosting windings 24 of reactors 20.

Two additional bridge type rectifiers 46 and 47 are provided for the excitation of field windings 12 and 13 respectively. The direct current output terminals of rectifiers 46 and 47 are directly connected to the field windings 12 and 13 respectively, output current from either rectifier thus serving to produce rotation of armature 11 in a direction determined by the particular field winding which is energized.

The rectifiers 46 and 47 are supplied with alternating current from supply terminals 40, the alternating current input to each rectifier having serially included therein, a pair of saturable reactors 48 and 49, respectively. The impedance of alternating current load windings 50 of reactors 48 thus controls the excitation of motor field winding 12, and similarly, the impedance of alternating current load windings 51 of reactors 49 controls the excitation of field winding 13.

The direct current control windings 52 of reactors 48 are serially included in a circuit comprising contacts 32–33, control windings 45 of reactors 42, and the direct current supply terminals 39. Thus, closure of contacts 32—33 causes direct current to flow through control windings 52 thereby decreasing the impedance of load windings 50 of reactors 48, increasing the output of rectifier 46 and thereby providing excitation for field winding 12. Simultaneously, the flow of this same direct current through control windings 45 of reactors 42 produces a decrease in impedance of load windings 44 with an accompanying increase in the output of rectifier 41 which supplies direct current to the armature current boosting control windings 24 of reactors 20. This increase in direct current flow through control windings 24 increases the current supplied to armature 11, thereby increasing the motor torque.

Similarly, closure of contacts 32—34 will provide excitation for field winding 13 causing rotation of armature 11 in the opposite direction. In this case, direct current flows through closed contacts 32—34, control wingings 53 of reactors 49, and control windings 45 of reactors 42. The control current in windings 53 increases the output of rectifier 47 thereby providing the desired excitation for field winding 13, and this same current flowing through control windings 45 of reactors 42 increases the output of rectifier 41 which in turn boosts the armature current as previously described.

The action of control lever 35, torsion spring 36 and receiver 31 to cause displacement of movable contact member 32 is in accordance with the description given above in conection with Figure 3.

The armature current boosting arrangement of Figure 5 results in motor performance characteristics which are illustrated in Figure 6. It will be noted from these curves that the torque-producing flux increases in substantially direct ratio to the magnitude of the error signal, and that the amount of increase in armature current is similarly linear with respect to the error signal. The torque increases with the error signal, thus providing for rapid acceleration to the predetermined desired speed. Although a linear relationship is preferred, the curve shown is sufficiently linear to yield good results in practice.

Figure 7 shows an arrangement generally similar to Figure 5, except that two motors are supplied with normally constant armature current from a single magnetic amplifier 60 which comprises the three saturable reactors 20 as shown in Figure 5. The armatures 11 and 11' are connected in series so that if increased current is called for by either control lever 35 or 35', the increased current will flow through both armatures by reason of the series connection.

The current boosting circuit is represented by a rectangle 61 and consists of a rectifier like rectifier 41 in Figure 5 whose output is connected to terminals 25, the magnitude of this output being determined by a pair of saturable reactors having suitable control windings. The reactors in Figure 7 differ from the reactors 42 in Figure 5, in that they are provided with two separate control windings 45 and 45' which are energized through movable contacts 32 and 32' respectively, associated with independent control levers 35 and 35'. Thus, when either of the two control levers 35 or 35' is displaced from its normal position, the current flow will be simultaneously increased in both of the serially connected armatures 11 and 11'.

The individual field controls 62 and 62' each consist of two separate sets of rectifiers as 46 and 47, together with saturable reactors 48 and 49 conected as shown in Figure 5. For simplicity, each of these circuits is represented diagrammatically by one of the rectangles 62 and 62'.

In the arrangements of Figures 1, 3 and 5, the rectifier 16 provides dynamic braking action when deceleration of the armature 11 is required. This improves the speed of response of the control system. In Figure 7, however, a further improvement is obtained since if one armature 11 is decelerating, and the other armature 11' is accelerating, energy is transferred from the decelerating armature to the armature which is accelerating.

Figure 8 illustrates another embodiment of the invention, in which certain feed-back paths are provided. One of these feed-back paths reduces the undesirable transient effects caused by electromagnetic coupling between the two motor field windings 12 and 13. Another feed-back path, associated with the armature circuit, reduces losses during armature deceleration and is particularly desirable where the motor is of comparatively large size.

In the control system of Figure 8, the input signal is assumed to be a unidirectional voltage whose magnitude and direction are selected in accordance with the desired speed and direction of rotation of armature 11. This input voltage is applied to terminals 81 which are directly connected to a corresponding pair of input terminals 82 of an amplifier 83.

Amplifier 83 is also provided with another pair of input terminals 84 which are shown directly connected to transmitter 30. Amplifier 83 may be of any desired type, such as electronic or magnetic, its internal construction being such that an output appears at terminals 85 which is directly proportional to the algebraic difference between the two unidirectional potentials applied to its input terminals 82 and 84. If the two inputs are of sufficient magnitude, the amplifier 83 may be omitted, and the algebraic difference obtained by direct differential connection. This algebraic difference is the error signal, and is applied to a symmetrical two-channel magnetic amplifier designated generally as 86.

Magnetic amplifier 86 consists of two self-excited saturable reactors, one being designated generally as 87 and the other as 88. Reactor 87 comprises a control winding 89 which controls the reactance of a load winding which is center tapped at 90, one half of the load winding being designated 91 and the other half 92. Reactor 87 also includes a feed-back winding 94 whose operation is described below.

Load winding 91—92 is connected in a bridge type rectifier arrangement to four half-wave rectifier elements 95 to 98. Alternating current from the secondary winding 99 of a power supply transformer 100 is applied between center tap 90 of load winding 91—92 and the junction between rectifier elements 97 and 98. The end of load winding 91 is connected to rectifier element 96 and the end of load winding 92 is similarly connected to rectifier element 95. It will thus be seen that load winding 91—92 can carry only a unidirectional current.

During one half cycle of the alternating current supplied by transformer 100, current may flow through load winding 91 and rectifier 96, the circuit being completed through rectifier 98. During the next half cycle, at which time the polarity is reversed, current will flow through load winding 92 and rectifier 95, the circuit being completed through rectifier 97. The amount of current flow will be determined by the effective half-wave reactance of load winding 91—92.

If the direction of current flow through the control winding 89 of reactor 87 is such as to oppose the magnetic effect of current flow through load winding 91—92 in the direction permitted by rectifiers 95 and 96, then its control effect upon the effective half-wave reactance of load winding 91—92 will be comparatively slight, and the full-wave output of the four rectifiers 95—98 will not be greatly affected. If the direction of current flow in control winding 89 be reversed, however, so that its saturation effect is cumulative with respect to the magnetic effect of current flow through load winding 91—92, then the output of rectifiers 95—98 will increase rapidly with increasing control current, thus providing a high gain. Loss of control is prevented by the fact that the current flow in load winding 91—92, although unidirectional, is nevertheless pulsating, consisting of successive half-waves which flow alternately through winding 91 and winding 92. Thus, for each successive half wave, the cumulative magnetic effect of the control current and the load current is separately and individually evaluated.

Self-excited saturable reactor 88 is similar in all respects to reactor 87, except that it is connected to respond to an error signal from amplifier output terminals 85 whose polarity is opposite to the polarity to which reactor 87 is responsive. Thus, an error signal of one polarity produces response in reactor 87 and an error signal of the opposite polarity produces response in reactor 88.

The response curves of reactors 87 and 88 are illustrated in Figure 11, the solid curve being that of reactor 87 and the dotted curve that of reactor 88. It will be noted that each response curve rises sharply for control current of the polarity intended to cause a control effect, and very slightly for control current of the opposite polarity.

The full-wave output of rectifiers 95—98, as controlled by reactor 87, is applied to the control winding 101 of a saturable reactor 102, the load winding 103 of which controls the output of a bridge type rectifier 104, alternating current being supplied by the secondary winding 105 of a power supply transformer 106.

Rectifier 104 supplies field current to field winding 12 through a circuit comprising a feed-back resistor 107 and a forcing resistor 108, together with a control winding 109 of another self-excited saturable reactor 110. This latter reactor 110 is arranged to increase the armature current in accordance with the amount of field excitation.

Similarly, reactor 88 through the intermediate action of saturable reactor 111 controls the output of bridge type rectifier 112 which supplies field current to motor field winding 13 through a circuit comprising feed-back resistor 113, armature current control winding 109 and forcing resistor 108.

For an error signal of one polarity, self-excited reactor 87 will cause excitation of field winding 12 to produce rotation of armature 11 in one direction. An error signal of the opposite polarity will influence self-excited reactor 88 thereby causing excitation of field winding 13 which produces rotation of armature 11 in the opposite direction. The direction of rotation of armature 11 is thus determined by the polarity of the error signal.

Since the amount of field excitation is determined by the magnitude of the error signal, the torque, and hence the acceleration of the armature 11 increases with an increased error signal. Excitation of either field winding 12 or 13 is accompanied by a flow of current through control winding 109 of reactor 110 which increases the armature current above its normal standby value, thereby further increasing the torque of armature 11.

When excitation is suddenly applied to field winding 12, the inherent electromagnetic coupling within the motor structure between winding 12 and winding 13 causes an induced voltage in winding 13 which tends to counteract the effect of the desired excitation of winding 12. This is to some extent offset by the action of forcing resistor 108, which reduces the amount of current which would otherwise flow as a result of this undesired induced voltage in winding 13. Resistor 108 also decreases the ratio of inductance to resistance in the circuit of the field windings, thereby reducing the effect of this inherent inductance and increasing the speed of response of the field circuit.

The effect of this magnetic coupling between field windings is further counteracted by a feed-back circuit which includes feed-back resistors 107 and 113 and feed-back windings 94 and 114 of self-excited reactors 87 and 88, respectively. Regardless of the structural details of the motor which result in a mutual inductance between the two field windings 12 and 13, the fundamental principle governing induced currents will necessarily prevail. This principle, sometimes referred to as Lenz's law, is that when a change in flux induces a voltage which produces a flow of current, the direction of flow of the induced current is such as to oppose the change in flux which generated this current. Obviously, this effect will retard the desired change in flux, thereby reducing the speed of response of the control system.

The field circuit feed-back path is therefore so arranged as to oppose the undesired induced field excitation, and at the same time, to assist the desired excitation called for by the error signal.

Assume, for example, that the error signal calls for a rapid increase in the excitation of field winding 12. An induced current will flow in field winding 13 as a result of magnetic coupling between the two field windings, the direction of this current flow being such as to oppose the desired increase in the excitation of field winding 12. The magnitude of this current, as previously stated, is reduced by forcing resistor 108. Insofar as its possible effect on either of the saturable reactors 103 or 111 is concerned, this is prevented by the shunting action of rectifiers 104 and 112.

The voltage drop across feed-back resistor 107, which accompanies the flow of field current in field 12, causes a current to flow through the feedback circuit comprising coil 94 of reactor 87, coil 114 of reactor 88, and feedback resistor 113. The resistance values of these circuit elements are so chosen that the undesired voltage drop across the feedback resistor 113 which is produced by the undesired induced current in field winding 13 will be negligible in comparison to the voltage drop across feedback resistor 107.

The resulting current flow through feedback windings 94 and 114 will produce a regenerative or boosting action with respect to the desired excitation of field 12, and a degenerative or bucking action with respect to the undesired induced excitation of field 13. This effect is caused by the polarities of the two feedback windings 94 and 114 relative to their respective reactors 87 and 88, regenerative action being prevented by the shunting action of rectifiers 94a and 114a shown bridged across feedback windings 94 and 114 respectively.

The shunting rectifiers 94a and 114a prevent undesirable regenerative increases in the outputs of their respective reactors 87 and 88, by diverting feedback current from the feedback winding 94 or 114 respectively of the particular reactor which is not furnishing any needed field excitation.

The input signal tends to cause a greater change in field excitation voltage than that needed for changing the excitation for steady state operation. This greater change in excitation voltage is available to force a faster change in the field current during the transitional interval in which the field excitation is changing. At the end of the transitional interval the feedback winding causes the excitation to assume the proper steady state value.

In Figure 8, the armature current boosting circuit comprises the three saturable reactors 20 included in the power input circuit of the three phase rectifier 16 which supplies a normally constant current to armature 11. The current in the control windings 24 of the reactors 20, is in this instance shown controlled by a self-excited saturable reactor 110 which is polarity-sensitive as described above for reactor 87. The direct current bias which determines the standby current in armature 11 is adjusted by the amount of current flowing through a bias control winding 115 of reactor 110 which is connected to bias terminals 23.

Reactor 110 is provided with an armature feedback winding 116 which is connected into the armature circuit to reduce power losses during deceleration, particularly during rapid reversal of the direction of rotation of armature 11.

If the armature 11 is rotating in one direction, and the error signal is suddenly reversed in polarity to call for rotation in the opposite direction, the back voltage of the armature will then be reversed so that it aids the supply voltage instead of opposing it. This will cause an increase in armature current, the increase being caused by a source which is entirely independent of the constant current action of the saturable reactors 20.

Armature feed-back coil 116 of saturable reactor 110 is connected into the armature circuit, and its polarity is such that an increase in armature current cancels the effect of biasing winding 115, thereby tending to reduce the armature current during the transitional interval in which the armature is reversing. The turn ratio between the boosting coil 109 and the feed-back coil 116 is such that the desired increase in armature current called for by coil 109 will be obtained, notwithstanding the degenerative feed-back action of coil 116. Any increase in armature current beyond that called for by coil 109, however, will tend to reduce the armature current both by opposition to the effect of coil 109 and by opposition to the action of biasing winding 115.

Reactor 110, being of the self-excited type, is polarity-sensitive. Therefore, an exceptionally large increase in armature current, sufficient to cause feed-back coil 116 to overbalance the other coils 109 and 115, will have very little effect on the output of reactor 110. This principle is illustrated in Figure 9 which shows typical response curves for a self-excited saturable reactor. Since reactor 110 controls the armature current through the reactors 20 and rectifier 16, there can be no harmful regenerative action which would tend to cause undue increase in the armature current. This same effect also prevents the constant standby armature current flowing through coil 116 from calling for an increased armature current by reason of its action on feed-back coil 116 of reactor 110.

It is to be noted, that feed-back coil 116 serves to prevent undesirable increases in armature current which are accompanied by corresponding power losses in the armature circuit with their ensuing heating effects. Where the duty cycle is relatively light, coil 116 may be omitted without danger of overheating. Feed-back coil 116, since it limits the armature current, also has a torque limiting effect which may be desirable in certain instances, since it will act to limit stresses applied to the driven load and corresponding stresses in its mechanical connections to armature 11.

Figure 9 illustrates characteristic curves for a motor operating in conjunction with the control system of the present invention. It will be noted from these curves, that by operating the motor field well into the non-linear region of the saturation curve, a substantially linear torque curve 9–01 will result. If operated only in the linear portion of the magnetization curve, the non-linear torque curve 9–02 (shown dotted) would be obtained. Although it is not essential to the operation of the control system of the present invention, it is desirable that the field structure comprising the field windings 12 and 13 be so dimensioned as to provide the characteristics illustrated in Figure 9.

Figure 10 shows a set of curves similar to those of Figure 9, the normally constant standby value of the armature current being zero. It will be observed that the torque curve is substantially linear, as in the case of Figure 9. While zero, as a normal standby value of armature current, will reduce the power losses in the control system, an appreciable value of standby current will eliminate any time delay in the armature circuit which might otherwise elapse before sufficient armature current is built up to provide the desired torque.

I have described what I believe to be the best embodiments of my invention. I do not wish, however, to be confined to the embodiments shown, but what I desire to cover by Letters Patent is set forth in the appended claims.

What is claimed is:

1. A control system for a direct current electric motor having an armature and a field winding, comprising: rectifying means connected to supply direct current to said armature, said rectifier being adapted for connection to an alternating current source for energization therefrom; a saturable reactor included in said rectifier energizing connection, said reactor having inherent constant current characteristics which maintain the current supplied to said rectifier and said armature at a substantially constant value throughout a wide range of variation in the voltage drop across said reactor; and means for supplying a current to the field winding, the magnitude of said field current being determined by the speed at which the motor is to operate.

2. In a control system for a direct current electric motor having an armature and a field winding, the control system being responsive to a unidirectional error signal; a saturable reactor having inherent constant current characteristics and having an alternating current load winding and a direct current control winding; a rectifier connected to the load winding and disposed to supply the armature with substantially constant direct current controlled by the saturable reactor; circuit means for supplying a direct current bias to the control winding of the reactor for adjustment of the magnitude of the constant armature current; a first control means for supplying direct current to the field winding for causing rotation of the armature; and a second control means responsive to rotation of the armature and disposed to influence the first control means in accordance with the direction and magnitude of the error signal.

3. A control system according to claim 2, further comprising a further direct current control winding on the saturable reactor; and further circuit means interconnecting the further control winding and the first control means for increasing the otherwise substantially constant armature current to an extent determined by the amount of direct current supplied to the field winding by the first control means.

4. A control system according to claim 2 in which the first control means is responsive to the magnitude of a unidirectional current; and the second control means comprises means driven by the armature and constructed and arranged to determine the direction and magnitude of a unidirectional current in accordance with the rotation thereof, the unidirectional current being applied to the first control means.

5. A control system according to claim 4 in which the means driven by the armature is a direct current generator.

6. In a control system for a direct current electric motor having an armature and a field winding; a saturable reactor of inherent constant current characteristics having an alternating current load winding and first and second direct current control windings; a rectifier connected to the load winding of the reactor and disposed to supply the armature with substantially constant direct current controlled by the saturable reactor; a first circuit means for supplying a direct current bias to the first control winding of the reactor for adjustment of the magnitude of the constant armature current; a first control means for supplying direct current to the field winding to cause rotation of the motor armature, the first control means being responsive to the magnitude of a unidirectional current; a second control means responsive to rotation of the armature and disposed to determine the magnitude of a unidirectional current in accordance with such rotation, said unidirectional current being applied to the first control means; and a second circuit means interconnecting the second control winding of the reactor and the first control means for increasing the otherwise constant armature current in accordance with the amount of field current.

7. A control system according to claim 6 for controlling the speed of the motor armature, in which the first control means is responsive to a unidirectional current of predetermined minimum magnitude, and wherein the second control means comprises means for determining the magnitude of a unidirectional current in accordance with the speed of armature rotation.

8. A speed control system according to claim 7 in which the second control means is a direct current generator.

9. A control system according to claim 6 in which the first control means comprises a field control saturable reactor having an alternating current winding and a direct current control winding, and a rectifier interconnected between the alternating current winding and the field winding, the unidirectional current from the second control means being applied to the direct current control winding of the field control reactor.

10. A control system according to claim 9 in which the second circuit means comprises an armature current boosting saturable reactor having an alternating current winding and a direct current control winding, a rectifier interconnected between the second control winding of the constant current reactor and the alternating current winding of the boosting reactor, the direct current control winding of the boosting reactor being connected for energization simultaneously with the direct current control winding of the field control reactor.

11. A control system according to claim 9 for controlling the speed of the motor armature, in which the first control means is responsive to a unidirectional current of predetermined minimum magnitude, and wherein the second control means comprises means for determining the magnitude of a unidirectional current in accordance with the speed of armature rotation.

12. In a control system for a plurality of direct current motors, the control system being independently responsive to an individual error signal for each motor, each motor having an armature winding and a field winding, said armature windings being connected for energization from a common supply; a saturable reactor having inherent constant current characteristics and having an alternating current load winding and a direct current control winding; a rectifier connected to the load winding of the reactor and disposed to supply the plurality of armatures with substantially constant direct current controlled by the saturable reactor; circuit means for supplying a direct current bias to the control winding of the reactor for adjustment of the magnitude of the constant armature current; a plurality of independent first control means for supplying direct current to each of the field windings for causing rotation of its associated armature; and a plurality of independent second control means, each responsive to rotation of one of the armatures and each disposed to influence one of the first control means for determining the rotational speed of its associated armature in accordance with the magnitude of the error signal.

13. A control system according to claim 12 further comprising a further direct current control winding on the saturable reactor; and further circuit means connecting the further control winding with all of the first control means for increasing the otherwise substantially constant armature current to an extent determined by the total amount of direct current supplied to all of the field windings.

14. A control system according to claim 12 in which each of the first control means is responsive to the magniture of a unidirectional current; and each of the second control means comprises a direct current generator independently driven by one of the armatures, the unidirectional current thus generated being applied to the particular first control means which supplies direct current to the field winding associated with said last-named armature.

15. In a control system for a direct current motor having an armature and a field winding; a saturable reactor having inherent constant current characteristics and having an alternating current load winding and a direct current control winding; a rectifier connected to the load winding and disposed to supply the armature with substantially constant direct current controlled by the saturable reactor; circuit means including a self-excited polarity sensitive saturable reactor for supplying a direct current to the control winding of the first-named reactor for controlling the magnitude of the otherwise normally constant armature current, the self-excited reactor having a feed-back winding; and a feed-back circuit including the armature and the feed-back winding, the feed-back winding being degeneratively connected for reducing the armature current during armature deceleration.

16. A control system for a direct current motor having a rotary armature and two field windings, simultaneous energization of said armature and one of said field windings causing rotation of said armature in one direction and simultaneous energization of said armature and the other of said field windings causing rotation of said armature in the opposite direction, said motor comprising magnetizable structure which inherently inductively couples said field windings to each other, said control system comprising: means for energizing said armature; means defining an input circuit for the control of said motor and adapted to have a unidirectional control potential applied thereto for determining the speed and direction of rotation of said armature in accordance with the magnitude and direction of said control potential; two unidirectionally responsive control means comprising means for energizing said field windings in accordance with the magnitude of said control potential, both of said control means being connected to said input circuit, one control means being responsive to one polarity of said control potential and the other of said control means being responsive to the opposite polarity of said control potential; circuit means connecting each of said field windings to one of said control means for selective energization therefrom in accordance with the polarity of said control potential for causing rotation of said armature in a direction determined by said polarity; and feedback means providing a feedback path between said field windings, said feedback means tending to prevent the effect of said inductive coupling from opposing a change in the energization of either of said field windings which would otherwise be caused by an accompanying induced current in the other field winding.

17. A control system according to claim 16, wherein each of said control means comprises amplifying means and in which said control means further comprises means for applying a supplementary control potential to each of said amplifying means, and wherein said feedback means comprises circuit means interconnecting both of said field windings and both of said means for applying said supplementary control potential regeneratively with respect to the particular field winding of which the energization is being changed by said first-named control potential in said input circuit and degeneratively with respect to the other field winding.

18. A control system for a direct current motor having a rotary armature and two field windings, simultaneous energization of said armature and one of said field windings causing rotation of said armature in one direction and simultaneous energization of said armature and the other of said field windings causing rotation of said armature in the opposite direction, said control system comprising: means for energizing said armature; means defining an input circuit for the control of said motor and adapted to have a unidirectional control potential applied thereto for determining the speed and direction of rotation of said armature in accordance with the magnitude and direction of said control potential; symmetrical two-channel amplifying means connected to said input circuit for response to said control potential, each of said two channels being selectively responsive to a different polarity of said control potential and each delivering a unidirectional current output in accordance with the magnitude of said control potential when said control potential is of the polarity to which the particular channel is responsive; circuit means connecting said two channels symmetrically to said two field windings for controlled selective individual energization of said field windings by said output currents, whereby the speed and direction of rotation of said armature is determined by the magnitude and direction of said control potential with a predetermined energization of said armature.

19. A control system according to claim 18 further comprising; means driven by said armature for generating a unidirectional speed potential of which the magnitude and direction are determined by the speed and direction of rotation, respectively, of said armature; and circuit means applying said speed potential to said input circuit differentially with respect to said control potential to derive an error signal, said amplifying means being responsive to said error signal, whereby the speed of said armature will remain substantially constant at a value determined by said control potential notwithstanding variations in the torque delivered by said armature.

20. A control system according to claim 18 wherein said means for energizing said armature comprises: an alternating current circuit adapted to be energized by an alternating current source; rectifier means connected for energization from said alternating current circuit and connected to supply direct current to said armature; and a saturable reactor included in said energizing connection from said alternating current circuit to said rectifier means, said reactor having inherent constant current characteristics which maintain the direct current supplied to said armature at a substantially constant magnitude notwithstanding an appreciable range of variation in the magnitude of the counter voltage opposing said supply of direct current from said rectifier means, said counter voltage being generated by said armature both in accordance with the speed of rotation thereof and in accordance with the magnitude of the armature excitation produced by either of said field windings.

21. A control system according to claim 20, wherein said saturable reactor comprises a load winding included in said energizing connection from said alternating current circuit to said rectifier means, and a control winding which controls the magnitude of an otherwise substantially constant alternating current flow through said load winding in accordance with the magnitude of a direct current flowing in said control winding; and circuit means connecting said control winding for simultaneous energization with each of said field windings, whereby said otherwise constant armature current will be increased in accordance with an increase in the magnitude of the output current from either of said amplifying means.

22. A control system according to claim 21, further comprising; means driven by said armature for generating a unidirectional speed potential of which the magnitude and direction are determined by the speed and direction of rotation, respectively, of said armature; and circuit means applying said speed potential to said input circuit differentially with respect to said control potential to derive an error signal, said amplifying means being responsive to said error signal, whereby the speed of said armature will remain substantially constant at a value determined by said control potential notwithstanding variations in the torque delivered by said armature.

23. A control system according to claim 22, wherein said means driven by said armature is a tachometer generator.

References Cited in the file of this patent

UNITED STATES PATENTS

| Number | Name | Date |
|---|---|---|
| 790,569 | Hemingway | May 23, 1905 |
| 1,426,123 | Stockle | Aug. 15, 1922 |
| 2,081,780 | Troger | May 25, 1937 |
| 2,086,594 | Young | July 13, 1937 |
| 2,288,339 | Willis | June 30, 1943 |
| 2,332,611 | Spencer | Oct. 26, 1943 |
| 2,501,528 | Mandl | Mar. 21, 1950 |
| 2,555,992 | Ogle | June 5, 1951 |
| 2,558,094 | King | June 26, 1951 |
| 2,622,239 | Bracutt | Dec. 16, 1952 |

FOREIGN PATENTS

| Number | Country | Date |
|---|---|---|
| 549,318 | Great Britain | Nov. 16, 1942 |

Disclaimer 2,709,234.—*Harold Levenstein*, Oceanside, N. Y., and *Michael Bracutt*, East Orange, N. J. ELECTRIC MOTOR SPEED CONTROL SYSTEM. Patent dated May 24, 1955. Disclaimer filed Feb. 20, 1957, by the assignee, *The W. L. Maxson Corporation*.

Hereby enters this disclaimer to claims 18 and 19 of said patent.

[*Official Gazette March 26, 1957.*]